United States Patent
Yoder et al.

(10) Patent No.: US 6,802,555 B2
(45) Date of Patent: Oct. 12, 2004

(54) LEVELING RAMP ASSEMBLY FOR SLIDE-OUT ROOM

(75) Inventors: Douglas J. Yoder, Nappanee, IN (US); Jerry L. Babcock, Waukesha, WI (US)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 10/639,043

(22) Filed: Aug. 12, 2003

(65) Prior Publication Data

US 2004/0130172 A1 Jul. 8, 2004

Related U.S. Application Data

(60) Provisional application No. 60/405,035, filed on Aug. 20, 2002.

(51) Int. Cl.[7] .................................................. B60P 3/34
(52) U.S. Cl. .................. 296/165; 296/26.09; 296/26.13
(58) Field of Search ................................. 296/165, 170, 296/171, 172, 175, 176, 26.08, 26.13, 26.05, 26.09

(56) References Cited

U.S. PATENT DOCUMENTS

| 5,620,224 A | * | 4/1997 | DiBiagio et al. | ........ | 296/26.13 |
| 5,758,918 A |  | 6/1998 | Schneider et al. |  |  |
| 6,601,896 B1 |  | 8/2003 | Nye et al. |  |  |
| 6,729,669 B2 | * | 5/2004 | McManus et al. | ....... | 296/26.13 |
| 2002/0078634 A1 | * | 6/2002 | McManus et al. | .......... | 296/171 |

* cited by examiner

*Primary Examiner*—Jason Morrow
(74) *Attorney, Agent, or Firm*—Quarles & Brady LLP (57) ABSTRACT

A leveling ramp assembly for a vehicle slide-out room includes a ramp member and a face member, the ends of which are mounted to the vehicle floor by a pair of end members. The ramp provides a declined surface extending from the vehicle floor to a base rail from which a channel flange depends defining an outwardly opening horizontal channel. The face member mounts to the front of the ramp member by inserting its support rail into the channel. The channel flange and support rail have corresponding lengthwise grip regions that mate and improve the connection. The assembly is modular in that any number of shorten ramp or face members can be coupled end to end to span the width of the slide-out room and the face member(s) can be interchanged with other face members having various profiles.

21 Claims, 8 Drawing Sheets

LEVELING RAMP ASSEMBLY FOR SLIDE-OUT ROOM

CROSS-REFERENCE TO RELATED APPLICATIONS

This application claims benefit to U.S. Provisional Application No. 60/405,035 filed on Aug. 20, 2002.

STATEMENT OF FEDERALLY SPONSORED RESEARCH OR DEVELOPMENT

Not applicable.

BACKGROUND OF THE INVENTION

The present invention relates to slide-out rooms for recreational vehicles, and in particular, to leveling systems for such slide-out rooms.

In order to increase the available interior space of recreational vehicles or trailers, slide-out rooms or sections can be made integral with the structure of the vehicle or trailer. During transit, these rooms can be retracted and stored in the interior of the vehicle or trailer, with the exterior wall of the slide-out room flush with the exterior of the vehicle or trailer. To use the slide-out room, the vehicle is first parked and leveled. The slide-out room is then slid outward from the vehicle, increasing the interior space of the vehicle. A number of motive devices are currently used to extend and retract slide-out rooms. These devices may be hydraulic, pneumatic, electric, simple gearing mechanisms, sheave and pulley arrangements, or various combinations thereof. U.S. Pat. No. 5,758,918 discloses one type of operating mechanism for a slide-out room.

For such slide-out rooms it is typically desirable to lower the slide-out room somewhat as it is extended so that the floors of the slide-out room and the vehicle's stationary room are generally at the same height. Leveling ramps are attached to the outside edge of the stationary room so that as the slide-out room is extended it slides down the ramp. It is common for a ledge to be provided for the inside edge of the slide-out room to rest on when it is fully extended. Usually an angled threshold piece is attached at the inside edge of the slide-out room to span the gap at the transition between the rooms.

Current ramp systems satisfactorily bring the floor of the slide-out room at or near the same height as the floor in the stationary room. Yet, typical ramps systems have to be cut to the specific dimension of the room opening width. Thus, the manufacturer must either custom cut the ramp for each order or maintain in inventory a variety of different lengths of ramps to fit a wide range of standard and custom room sizes. Moreover, since the rooms are often ten feet or more in width, it is typically necessary to inventory lengthy sections to cut down to the custom size. Left over short sections of the stock pieces often cannot be used (even if of considerable size) resulting in a waste of materials.

Accordingly, an improved leveling system is needed.

SUMMARY OF THE INVENTION

The present provides a leveling system for a slide-out room of a recreational vehicle. The leveling ramp assembly can include a ramp member and a face member. The ramp member has an elongated planar base rail and an elongated ramp declining from a floor of the vehicle to the base rail. A channel flange spaced from and extending in a plane generally parallel with the base rail defines a channel opening toward a front edge of the ramp member. The face member has an elongated planar face wall and an elongated planar support rail extending at an angle to the face wall so as to lie within the channel of the ramp member and connect the face member to the ramp member.

In a preferred form, there are at least two ramp members each extending less than the width of the slide-out room and connected end to end by the face member. And, there are at least two face members each extending less than the width of said slide-out room and disposed end to end and connected to one or more ramp members. Two end members connect ends of the ramp and face members to a frame of the vehicle. The end members each include a first plate perpendicular to the extension of the ramp and face members and a second plate mounted to the first plate to extend perpendicular to the first plate. The second plates have openings for fasteners to secure the end members to the vehicle frame.

In another form, the ramp member has a mounting flange extending from an intermediate location at an underside of the ramp generally parallel with the base rail and beyond an inner edge of the ramp. The mounting flange includes openings for fasteners to secure the ramp member to the vehicle floor.

Still further, the face member has upper, middle and lower rails. The lower rail can extend outwardly beyond a front of said face wall and there can be a back wall extending parallel to the face wall at inner edges of the middle and lower rails. The support rail and the channel flange have grip regions with mating indentations and projections.

In another preferred form, the invention provides includes an elongated ramp member defining a mounting flange and a sloped section declining therefrom to a base rail substantially parallel to the flange. The ramp member defines a groove opening in the direction of and substantially parallel to the ramp section. An elongated glide member has its own mounting flange and sloped section at an angle corresponding to that of the ramp so that the glide member nests on top of the ramp member. The glide member defines a bump section at the intersection of the flange and the sloped section having a leading side surface co-planar with the sloped section and a trailing side surface extending at an angle from the horizontal section of the glide member. A pair of end members support the ramp member from beneath at opposite ends. Preferably, the ramp member is aluminum and the glide member is plastic.

Thus, the invention provides a modular ramp assembly for leveling a slide-out room floor to a stationary room floor. The modular components can be assembled as needed to fit various room dimensions, thereby reducing the need for custom fitting. The lengths of individual pieces can be shorter, thus making shipping easier and less costly. The modular nature of the ramp assembly also provides flexibility in that a variety of facia can be assembled to the ramp as desired.

The ramp assembly also greatly improves the slideability of the slide-out room by extending the sloped or ramped sections of the assembly up to and above the height of the main floor. The slide-out floor thus rides along the extending section or bump of the ramp (spaced from the stationary floor) as it is retracted and extended. Doing so reduces the contact area between the slide-out and stationary floors, which correspondingly reduces the sliding friction therebetween. Reducing sliding friction extends the operational life of the drive components and reduces wear on the stationary room flooring.

These and other advantages of the invention will be apparent from the detailed description and drawings.

DETAILED DESCRIPTION OF THE PREFERRED EMBODIMENTS

Figure 1:
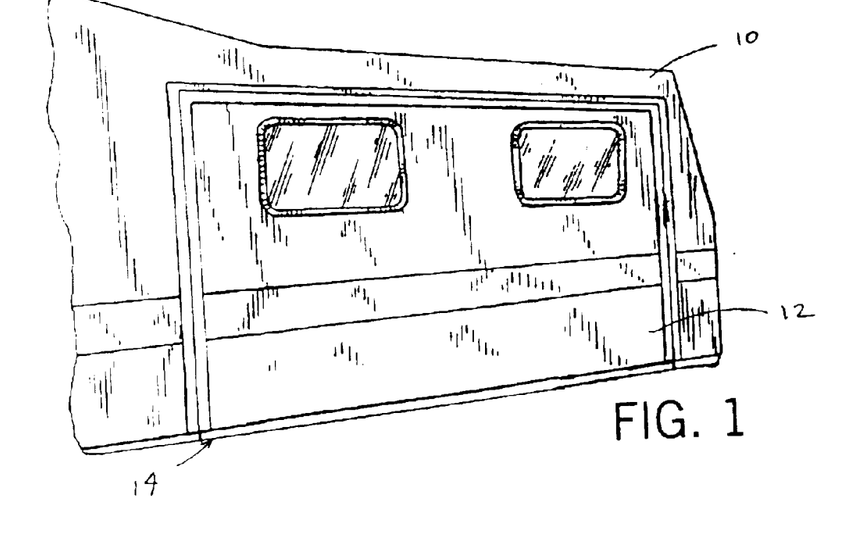
FIG. 1 is a partial perspective view of a recreational vehicle with a slide-out room (shown retracted) having the floor leveling ramp assembly of the present invention.
Figure 2:
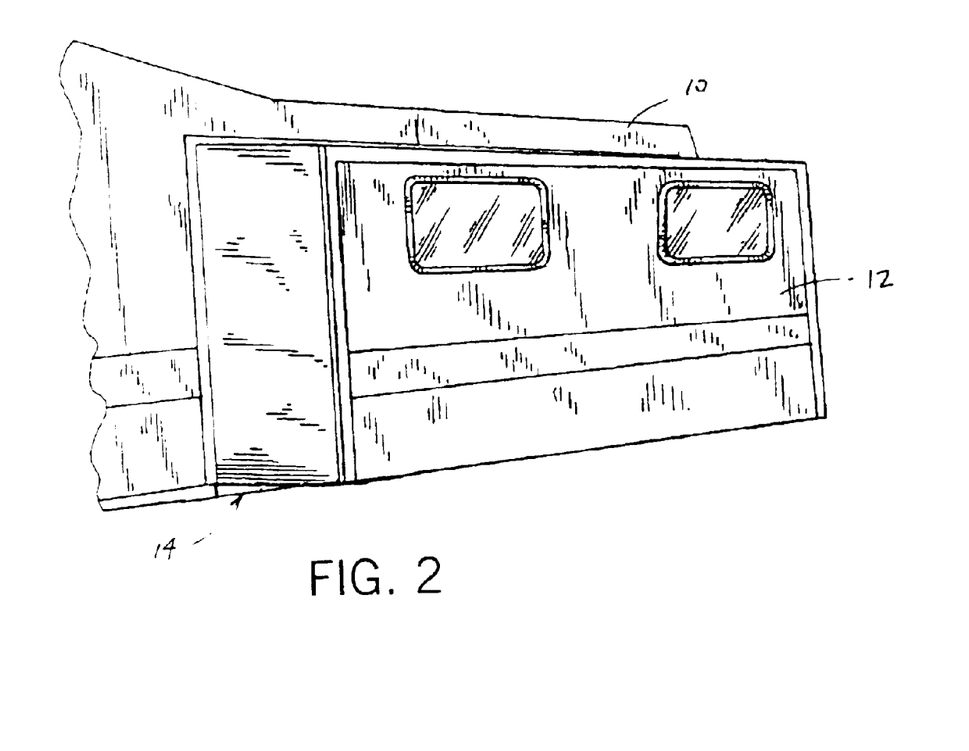
FIG. 2 is a view similar to FIG. 1 with the slide-out room extended.

The present invention provides a modular leveling ramp assembly for a slide-out vehicle room, such as for a recreational vehicle 10 having a slide-out room 12, which is shown retracted in FIG. 1 and extended in FIG. 2. Such slide-out rooms are common in recreational vehicles to provide increased interior space when the vehicle is parked without being at the extended width when traveling.

Figure 3:
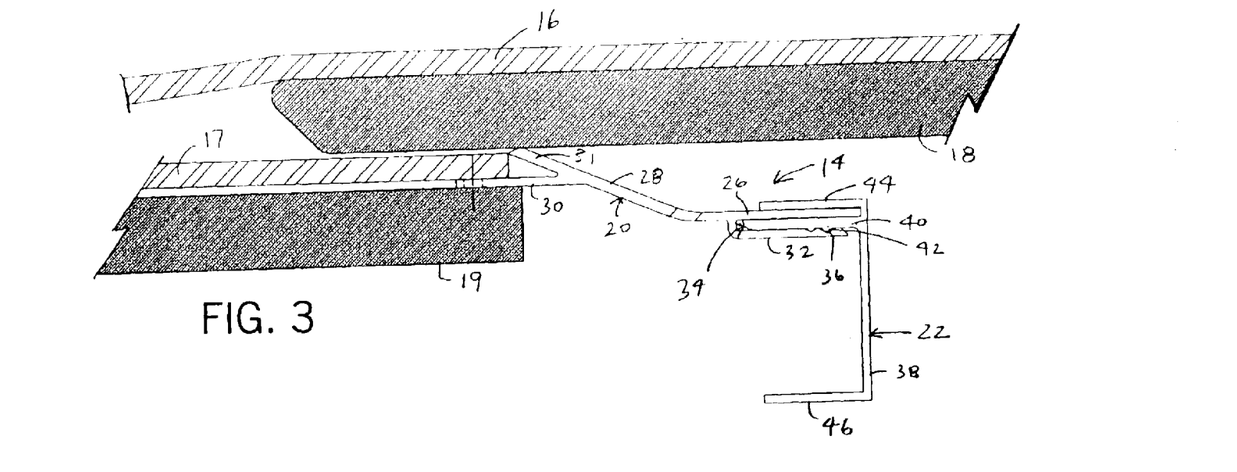
FIG. 3 is an end cross-sectional view showing the ramp assembly with the slide-out floor being retracted.
Figure 4:
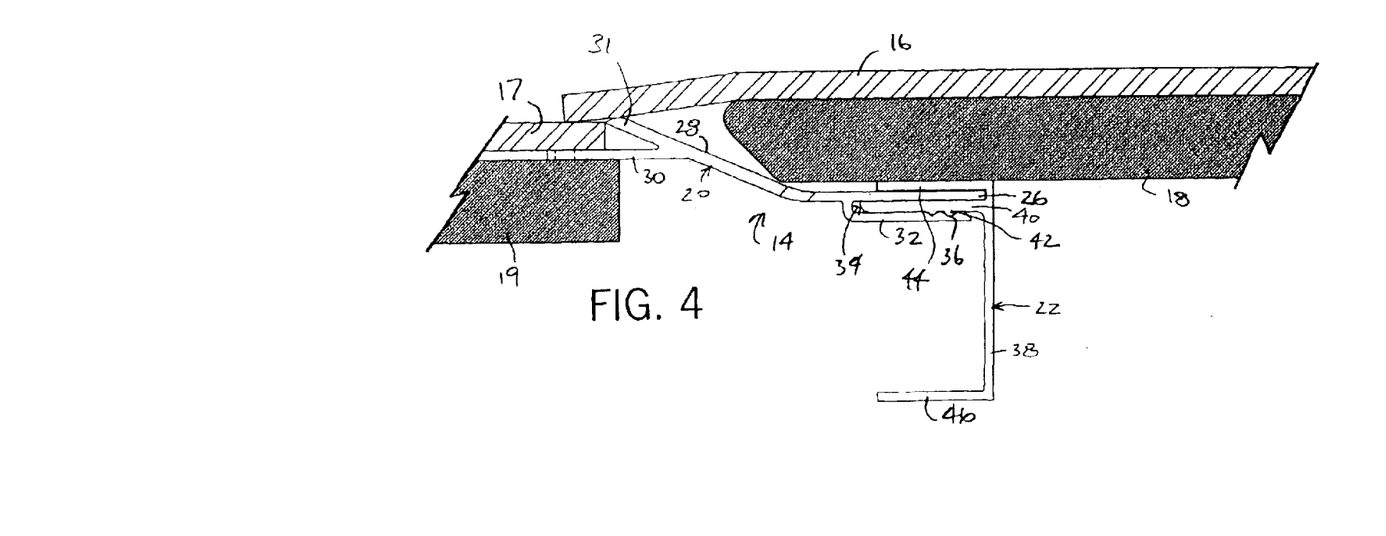
FIG. 4 is an end cross-sectional view similar to FIG. 3 although with the slide-out floor extended.
Figure 5:
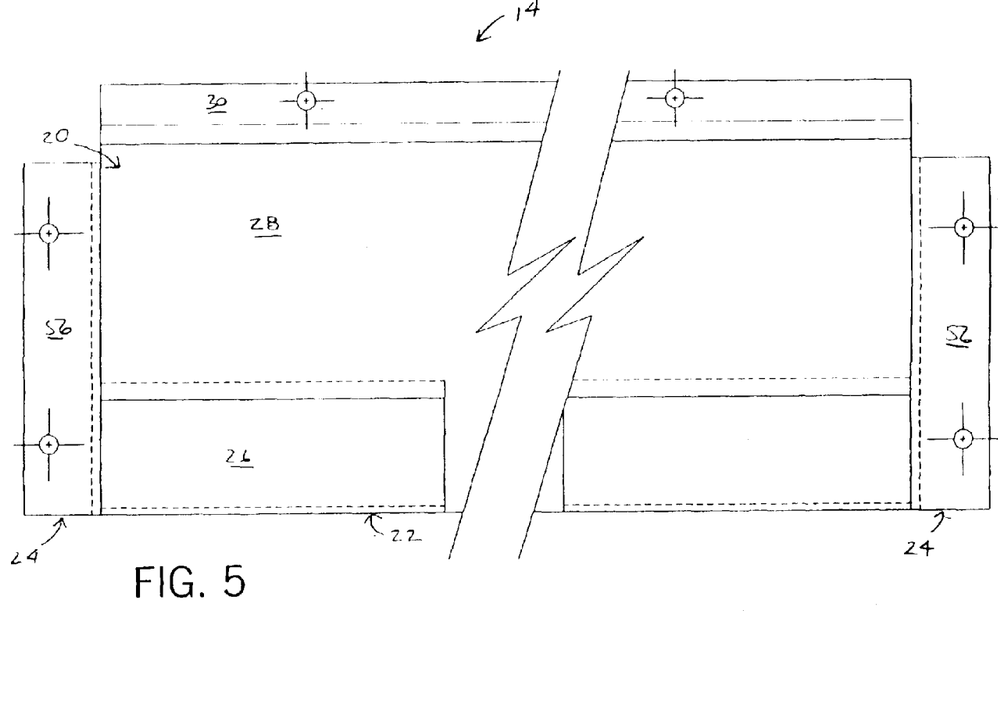
FIG. 5 is a broken top view of the ramp assembly.
Figure 6:
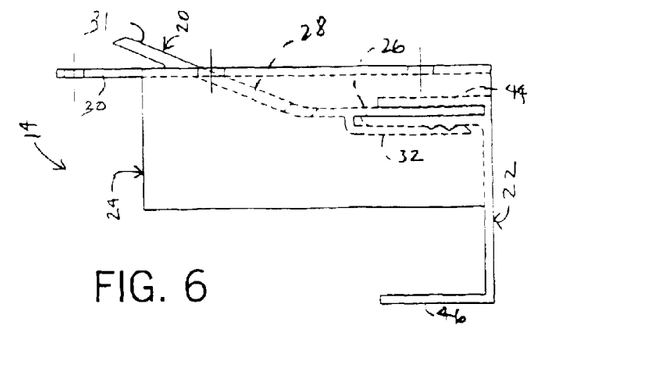
FIG. 6 is an end view thereof.

The ramp assembly is referred to generally in the drawings by reference numeral 14. FIG. 3 shows the ramp assembly when the room is in the process of being retracted into the vehicle and FIG. 4 shows the slide-out floor fully extended. In both figures, the slide-out and stationary floors are shown as including main floors 16 and 17, such as carpet, vinyl floor or tile, and sub-floors 18 and 19. Referring to FIGS. 3–6, the ramp assembly 14 consists of one or more ramps 20, one or more face members 22 and a pair of end members 24. Generally, the ramp(s) mount to the stationary room of the vehicle and the face members mount to the ramp(s) and the end members mount the outer ends of the ramps(s) to the vehicle, preferably at a structural component such as the vehicle frame.

Figures 7, 8, 9:
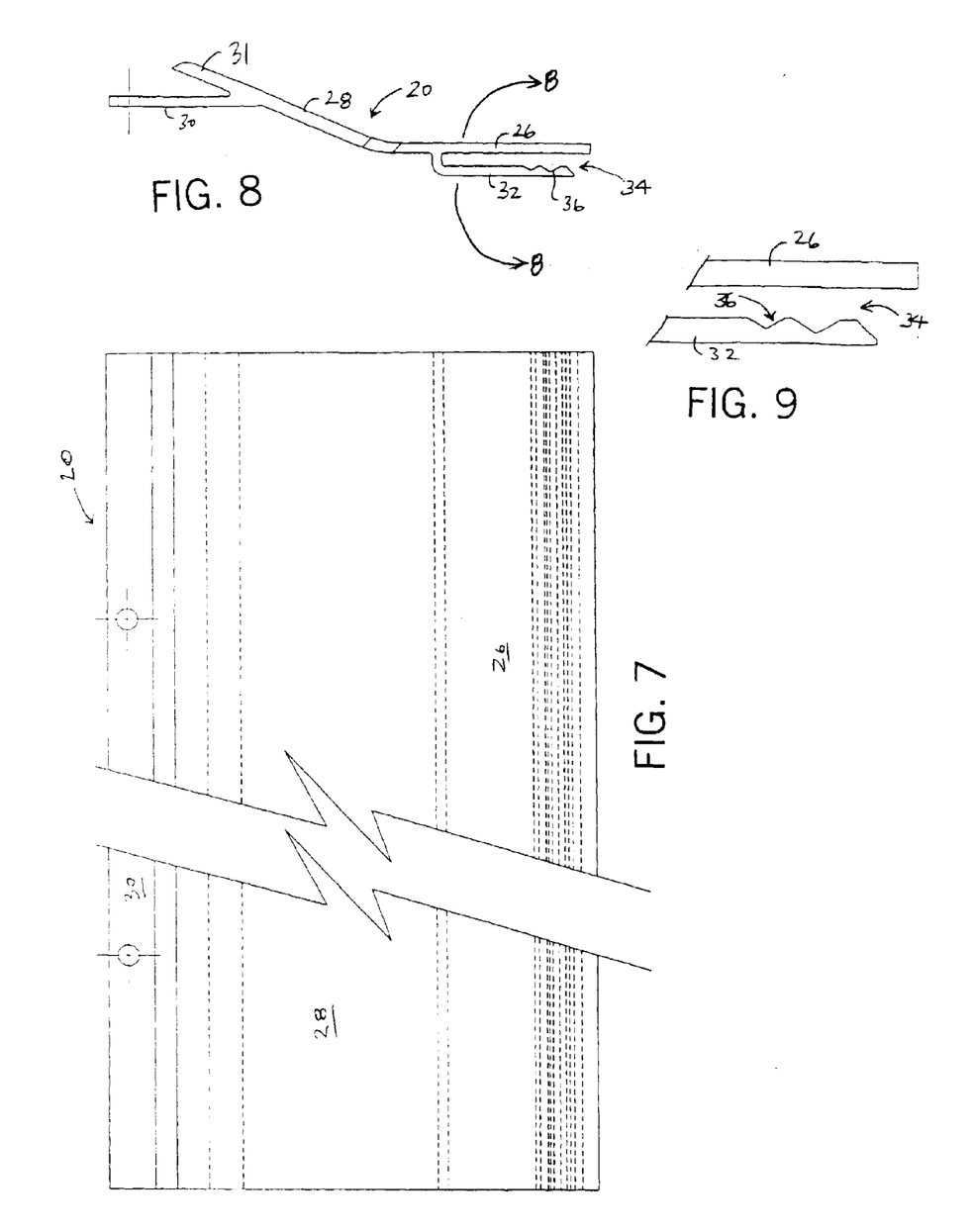
FIG. 7 is a broken top view of a ramp member.
FIG. 8 is an end view of the ramp member of FIG. 7.
FIG. 9 is an enlarged view of a grip section of the ramp member taken along arc 9—9 of FIG. 8.
Figure 10:
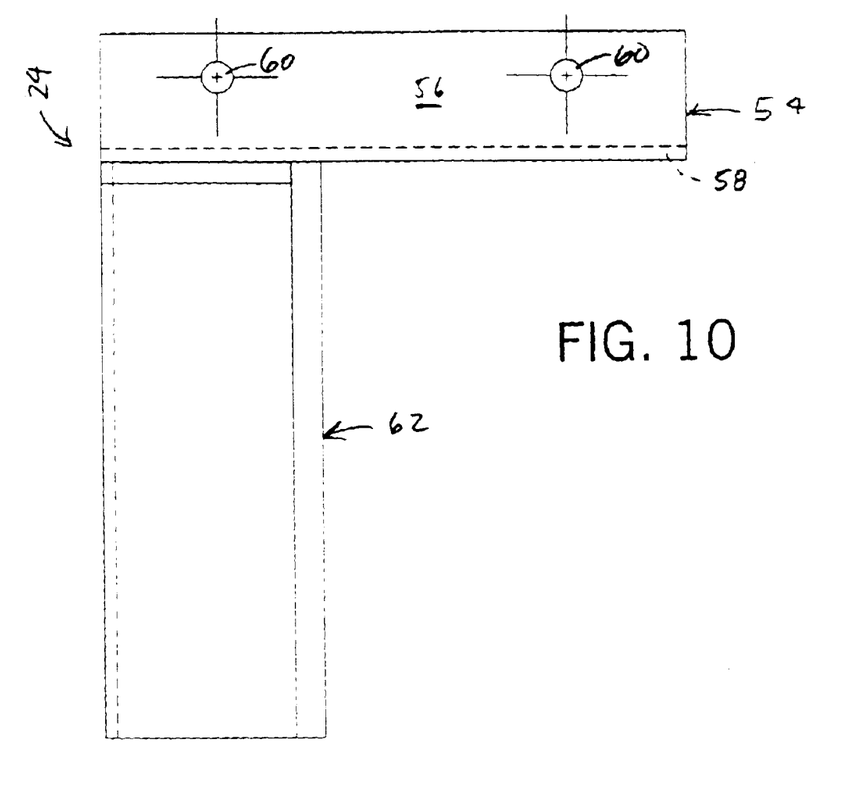
FIG. 10 is a top view of an end member of the ramp assembly.
Figure 11:
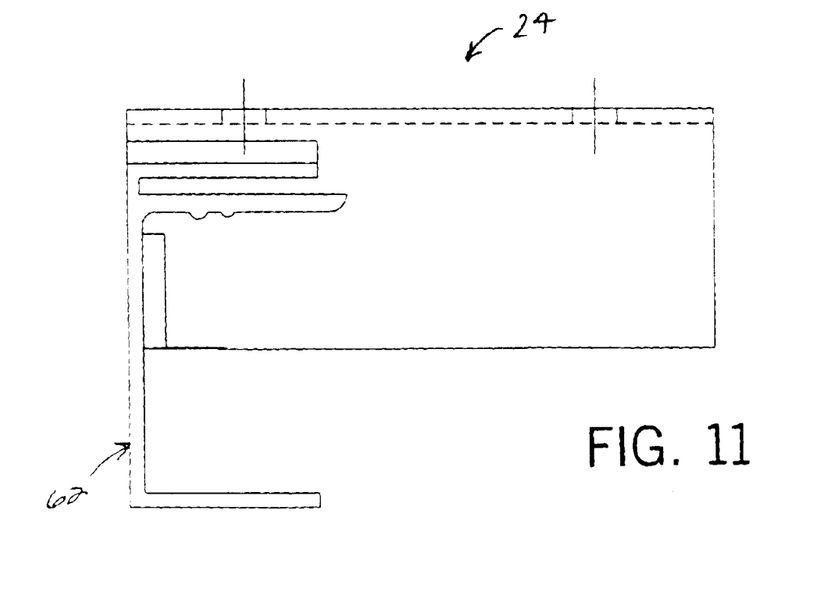
FIG. 11 is an end view of the end member of FIG. 10.

Referring to FIGS. 7–9, each ramp is preferably an extruded aluminum piece defining an elongated planar base rail 26 and an elongated ramp section 28 angled up from the base rail approximately 30 degrees. A mounting flange 30 extends out horizontally from the ramp section 28 beyond its upper extent or lip 31. The lip 31 extends the ramped surface of the assembly to or slightly above the top plane of the main floor to so as to lift the slide-out floor off of the stationary floor and thereby improve sliding in the open and close directions. The mounting flange includes openings spaced along its length for fasteners to fit through and into the sub-floor of the stationary room floor. A channel flange 32 extends from an underside of the base rail. The channel flange 32 extends parallel to the base rail and defines a channel 34 opening to a front edge of the ramp. The channel flange has a toothed section 36 defined by two indentations or grooves near the front end of the flange.

Referring to FIGS. 3 and 4, each face member defines an elongated planar face wall 38 and an elongated planar support rail 40 extending horizontally inward from the face wall so as to fit into the channel 34 of the ramp. The support rail 40 has a toothed section 42 at its underside that mates with the teeth of the channel flange when the face member is fully seated against the ramp.

Figures 12, 13, 14:
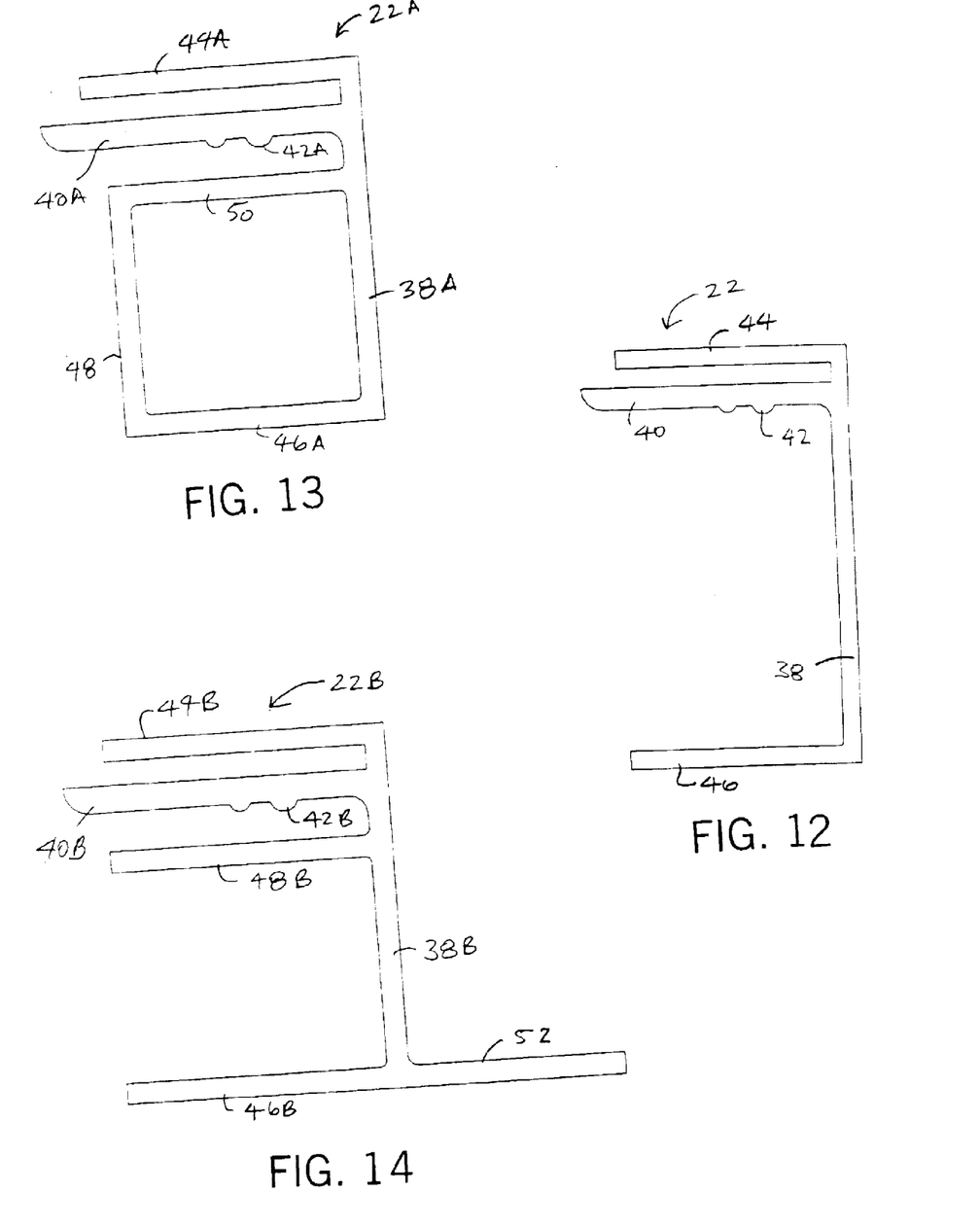
FIG. 12 is an end view of a preferred face member with an open back face.
FIG. 13 is an end view of an alternate (closed) face member.
FIG. 14 is an end view of another alternate ("T") face member.

The face members are preferably extruded aluminum and can be formed to have any number of profiles (see e.g. FIGS. 12–14). Preferably, however, different profiles will have the face wall and the support rail in common so that the connection of the face member to the ramp remains consistent. In one preferred form shown in FIG. 12, the face wall extends past the support rail to a top rail 44 extending horizontally inward parallel to the support rail 40. Beneath the support rail, the face member defines a lower rail 46.

FIGS. 13 and 14 show other preferred profiles for the face members. Elements similar to the above described embodiment will be referred to using similar reference numerals albeit with the an alphabetic suffix. Specifically, like the prior embodiment, the face member 22A of FIG. 13 has a face wall 38A, a support rail 40A with a toothed section 42A, a top rail 44A and a lower rail 46A. Unlike the prior embodiment, here there is a middle rail 48 and a back wall 50 beneath the support rail. The middle rail 46 is spaced down from the support rail to allow space for the channel flange of the ramp. Note also that the face member 22A is shorter than that of the previous embodiment. Thus, the back face of the face member is closed. The face member 22B shown in FIG. 14 includes a face wall 38B, a support rail 40B with a toothed section 42B, a top rail 44B and middle 48B and lower 46B rails, as described above. Here, there is no back wall and the lower rail extends outwardly beyond the front of the face wall to define a bottom ledge 52 that can be used to further secure the face to a structural member of the vehicle. The various profiles are designed to enhance the flexibility and modularity of the assembly by providing face members of various configurations which correspond to vehicle frame configurations of various recreational vehicles and vehicle types.

Regardless of the profile of the face member or the quantity of face members or ramps used, there are only two end members 24 connecting ends of the ramp(s) and face member(s) to the vehicle. Referring to FIGS. 5, 6, 10 and 11, each end member 24 includes an L-section 54 comprised of two perpendicular plates 56 and 58 disposed horizontally with their lengths extending perpendicular to the extension of the ramp(s) and face member(s). Plate 56 has openings 60 for fasteners (not shown) for securing the end members to the vehicle. Each end member also has a face section 62 mounted at a right angle to the L-section, preferably by welding. The face section 62 is a shortened section, preferably five inches, of face member extrusion preferably selected to match the profile of the face member(s), although not necessarily.

The ramp assembly can be provided with two end members, a single full-length ramp and a single full-length face member of the desired profile. Or, preferably, the ramp assembly can include multiple ramps and face members less than full-length and joined end to end. One preferred ramp assembly for a standard 10 foot slide-out room includes two end members, three 40 inch ramps, and two 55 inch face members. This provides a compact unassembled package that is convenient to ship and store separately from the vehicle if necessary.

The end members are screwed to the vehicle frame and the ramp members attach to the end members by sliding the outer end of each ramp member onto the end members so that support rails fit into the channels of the ramp members and the corresponding toothed sections engage. The inner ends of the ramp members are coupled together by pushing the face members onto the ramp members by fitting their support rails into the channels until the toothed sections engage. The three ramps are preferred so that the seams between the ramps do not align with the seams between the face members.

The invention thus provides a modular ramp assembly for leveling a slide-out room floor to a stationary room floor. The modular components can be assembled as needed to fit various room dimensions, thereby reducing the need for custom fitting and shortening the lengths of individual pieces thereby making shipping easier and less costly. The modular nature of the ramp assembly also provides flexibility in that a variety of facia can be assembled to the ramp as desired.

Figure 15:
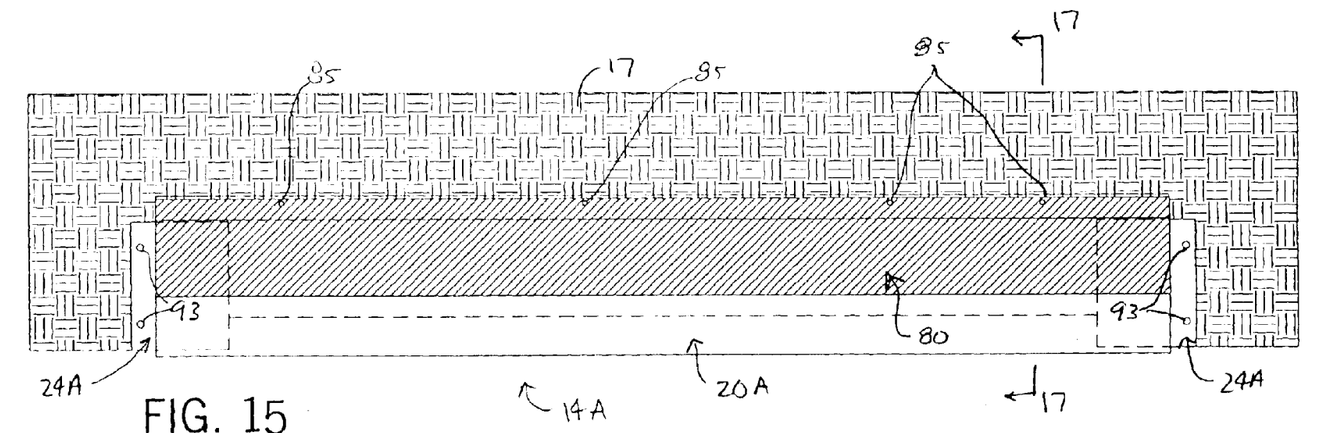
FIG. 15 is a top view of another preferred embodiment of the ramp assembly having a low-friction glide member and a unitary ramp member defining a face profile.
Figure 16:
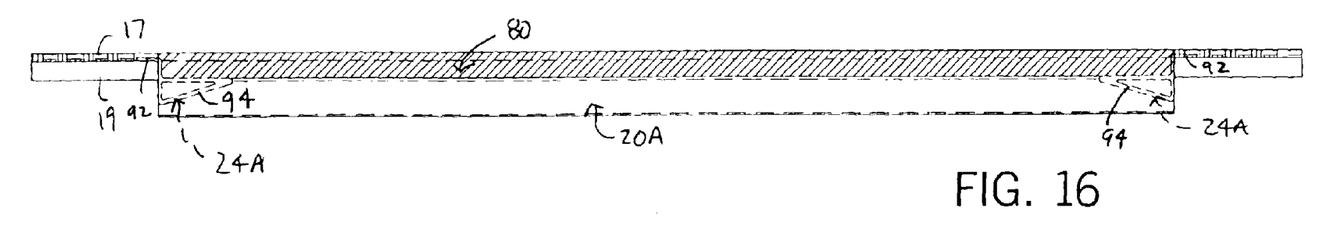
FIG. 16 is a front elevational view thereof.
Figure 17:
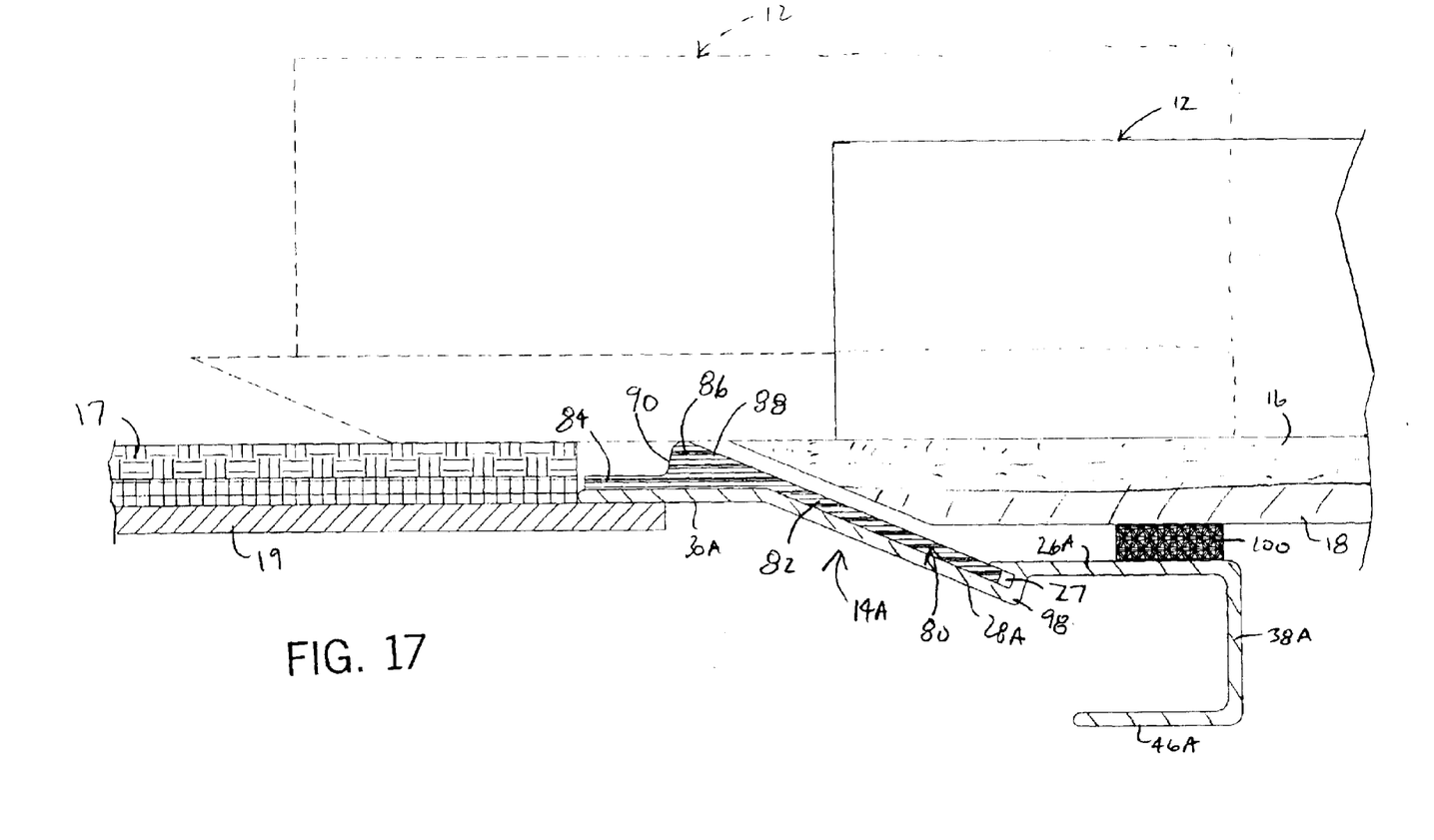
FIG. 17 is a side cross-sectional view taken along line 17—17 of FIG. 15 with the slide-our room shown in an extended position and in a retracted position (in phantom).

FIGS. 15–17 illustrate another preferred ramp assembly. Elements similar to the above described embodiment(s) are referred to using the same references number albeit with the suffix "A". Ramp assembly 14A consists of one or more ramps 20A, defining a monolithic front face, one or more glide inserts 80 and a pair of end members 24A. Like the above-described embodiment, the ramp assembly can include multiple ramps and glide inserts less than full-length and joined end to end. However, preferably, this version of the ramp assembly includes a single full-length ramp of the desired profile and a single full-length glide insert, and will thus be described accordingly below.

The ramp 20A is preferably an extruded aluminum piece defining an elongated planar base rail section 26A, an elongated ramp section 28A angled up from the base rail section approximately 30 degrees and a mounting flange 30A extending out horizontally from the upper edge of the ramp section 28A. These three sections thus define an elongated ramp have a flat upper section, sloping down to a flat lower section. The mounting flange 30A includes openings spaced along its length for screws to fit through to thread into the mounting surface, such as the stationary room sub-floor 19.

Extending perpendicularly down from the leading edge of the base rail section 26A is a face wall 38A. A lower rail section 46A extends parallel to the base rail section 26A from the lower edge of the face wall 38A. The rearwardly opening channel formed by the base rail section 26A, face wall 38A and lower rail section 46A can hold a solid or tubular elongated support member (not shown) secured to the ramp by suitable fasteners to strengthen the ramp across its length (between the ends) to decrease deflection therein when the slide-our room is extended and retracted. While FIG. 17 shows the ramp defining a face similar to that defined by the separate face member 22 of FIG. 12, it could be any suitable configuration to as needed to mount to variously configured recreational vehicles.

The ramp 20A also defines a groove 27 between its base rail 26A and ramp sections 28A for receiving a leading edge of a glide insert 80 mounted on top of the ramp 20A. The glide insert 80 is preferably made of a rigid, low friction material, such as a high density plastic, for reduced sliding resistance. The glide insert 80 defines a sloped section 82 and a horizontal section 84 having spaced openings 85 for the ramp mounting screws. Between these two sections, the glide insert 80 defines an elongated bump section 86 having a leading side surface 88 aligned with the that of the sloped section 82 and a trailing side surface 90 at an angle (near 90 degrees) from the horizontal section 84.

Two end members 24A support the ends of the ramp 20A to the vehicle, as shown in FIG. 16. Each end member 24A defines an inverted L-shaped section 54A with a horizontal mounting flange 92 having openings 93 for screws for securing the end members to the stationary room sub-floor 19. Each end member also has a triangular tube section 94 extending horizontally. The end members 24A are preferably extruded aluminum sections approximately 5 inches in length and 4 inches deep.

The top surface of the tube section 94 of each end member 24A could be machined to have a notch accommodating the bottom leading edge 98 of the ramp section 28A so that the underside of the base rail section 26A of the ramp could lie flat against the top of the end member tube section 94. The end members could take on other configurations that would allow the ramp to lie flat against the end members in surface contact. For example, each end member could be formed so that at the underside of the ramp, a horizontal surface extends from the lowest point (leading edge 98) of the ramp section 28A to the face wall 38A. This could be by adding material to the base rail section 26A or by adding a horizontal wall vertically spaced from the base rail section 26A. The end members 24A could also be weldments, rather than extrusions, for example like those described above, configured as needed to support the ramp along the flat underside of the base rail section 26A. Additionally, the end members could also be cast to have a supporting surface that corresponds to the profile of the underside of the ramp. In this case, the end members would support the ramp along their entire lengths.

In any event, the glide insert 80 mounts to the assembly by simply inserting its leading edge into the groove 27 and resting it on the ramp 20A. With the end members 24A in place perpendicular to the length of the ramp, the ramp and insert are set on top of the end members with the underside of the flat base rail section of the ramp resting on top of the tubular section. All three components are then secured in place by suitable fasteners placed in the openings (85 and 93) along the horizontal mounting sections of these components. These sections butt up to the outer edge of the stationary room sub-floor 19 and lie beneath the main floor 17 (e.g. carpet). Like the upper lip 31 of the first described ramp, the bump section 86 extends the ramped surface of the assembly to (or slightly above) the top plane of the main floor to so as to support the slide-out floor off of the stationary floor and thereby improve sliding in the open and close directions. A felt strip 100 can be attached to the top side of the ramp base rail section 26A to seal off the vertical space between the ramp 20A and the bottom of the slide-out room sub-floor 18 when it is in the extended position. This helps prevent insects from getting into the vehicle and keeps small objects from being caught between the rooms, which could interfere with the travel of the slide-out room.

An illustrative embodiments of the present invention have been described above in detail. However, the invention should not be limited to the described embodiments. To ascertain the full scope of the invention, the following claims should be referenced.

What is claimed is:

1. A leveling ramp assembly for a slide-out room for a vehicle, comprising:

a ramp member defining an elongated planar base rail and an elongated ramp for declining from a floor of said vehicle to said base rail, said ramp member further defining a channel flange spaced from and extending in a plane generally parallel with said base rail to define a channel opening toward a front edge of said ramp member; and a face member defining an elongated planar face wall and an elongated planar support rail extending at an angle to said face wall so as to lie within said channel of said ramp member and thereby connect said face member to said ramp member.

2. The ramp assembly of claim 1, wherein there are at least two ramp members each extending less than the width of said slide-out room and connected end to end by said face member.

3. The ramp assembly of claim 1, wherein there are at least two face members each extending less than the width of said slide-out room, said face members being disposed end to end and connected to at least one said ramp member.

4. The ramp assembly of claim 1, further comprising two end members connecting ends of said ramp and face members to a frame of said vehicle.

5. The ramp assembly of claim 4, wherein said end members each include a first plate perpendicular to the extension of said ramp and face members and a second plate mounted to said first plate to extend perpendicular to said first plate.

6. The ramp assembly of claim 5, wherein said second plates have openings for fasteners securing said end members to said vehicle frame.

7. The ramp assembly of claim 5, wherein said end members further include face member sections secured to said first plates.

8. The ramp assembly of claim 1, wherein said ramp member further defines a mounting flange extending from an intermediate location at an underside of said ramp generally parallel with said base rail and beyond an inner edge of said ramp.

9. The ramp assembly of claim 8, wherein said mounting flange includes openings for fasteners securing said ramp member to said vehicle floor.

10. The ramp assembly of claim 1, wherein said face member further defines an upper rail spaced from and extending inwardly parallel with said support rail at an upper edge of said face wall.

11. The ramp assembly of claim 10, wherein said face member further defines a lower rail extending inwardly parallel with said support rail at a lower edge of said face wall.

12. The ramp assembly of claim 11, wherein said face member further defines a middle rail extending inwardly parallel with said support rail at an intermediate location along said face wall between said support rail and said lower rail.

13. The ramp assembly of claim 12, wherein said lower rail extends outwardly beyond a front of said face wall.

14. The ramp assembly of claim 12, wherein said face member further defines a back wall extending parallel to said face wall at inner edges of said middle and lower rails.

15. The ramp assembly of claim 1, wherein said support rail and said channel flange have mating grip regions.

16. The ramp assembly of claim 15, wherein said grip region of said channel flange includes at least one indentation in an upper surface thereof and wherein said grip region of said support rail includes at least one projection in a lower surface thereof engaging said at least one indentation when said face member is connected to said ramp member with said support rail disposed in said channel.

17. The ramp assembly of claim 16, wherein said at least one indentation and said at least one projection extend the length of respective said channel flange and said support rail.

18. The ramp assembly of claim 17, wherein said at least one indentation is proximate a free edge of said channel flange.

19. A leveling ramp assembly for use with a vehicle slide-out room, comprising:

a ramp member extending substantially a width of said slide-out room and defining an elongated planar base rail and an elongated ramp declining from a floor of said vehicle to said base rail, said ramp member further defining a channel flange spaced from and extending in a plane generally parallel with said base rail to define a channel opening toward a front edge of said ramp member;

a face member extending substantially the width of said slide-out room and defining an elongated planar face wall and an elongated planar support rail extending at an angle to said face wall so as to lie within said channel of said ramp member and thereby connect said face member to said ramp member; and a pair of end members connecting ends of said ramp and face members to said vehicle, said end members each including a first plate perpendicular to the extension of said ramp and face members and a second plate mounted to said first plate and extending perpendicular to said first plate.

20. A ramp assembly for a recreational vehicle slide-out room, comprising:

an elongated ramp member defining a mounting flange and a sloped section declining therefrom to a base rail substantially parallel to the flange, the ramp member defining a groove opening in the direction of and substantially parallel to the ramp section;

an elongated glide member having a mounting flange and a sloped section declining therefrom at an angle corresponding to that of the sloped section of the ramp so that the glide member nests on top of the ramp member, the glide member defining a bump section at the intersection of the flange and the sloped section having a leading side surface co-planar with the sloped section and a trailing side surface extending at an angle from the horizontal section; and a pair of end members supporting the ramp member from beneath at opposite ends.

21. The ramp assembly of claim 20, wherein the ramp member is aluminum and the glide member is plastic.

* * * * *